(12) United States Patent
McKenney (10) Patent No.: US 9,348,765 B2
(45) Date of Patent: May 24, 2016

(54) EXPEDITING RCU GRACE PERIODS UNDER USER MODE CONTROL

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 13/829,788

(22) Filed: Mar. 14, 2013

(65) Prior Publication Data

US 2014/0281295 A1    Sep. 18, 2014

(51) Int. Cl.
    *G06F 9/54*     (2006.01)
    *G06F 12/12*    (2016.01)
    *G06F 9/52*     (2006.01)

(52) U.S. Cl.
    CPC .............. *G06F 12/121* (2013.01); *G06F 9/526* (2013.01); *G06F 2209/521* (2013.01)

(58) Field of Classification Search
    CPC .. G06F 12/121; G06F 9/526; G06F 2209/521
    See application file for complete search history.

(56) References Cited

U.S. PATENT DOCUMENTS

| | | |
|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,349,926 B2 | 3/2008 | McKenney et al. |
| 7,353,346 B2 | 4/2008 | McKenney et al. |
| 7,395,263 B2 | 7/2008 | McKenney |
| 7,395,383 B2 | 7/2008 | McKenney |
| 7,426,511 B2 | 9/2008 | McKenney |

(Continued)

OTHER PUBLICATIONS

P. Zijlstra, "[PATCH] slab: document SLAB_DESTROY_BY_RCU", LKML.org, Nov. 13, 2008, 1 page.

(Continued)

*Primary Examiner* — Syed Roni
(74) *Attorney, Agent, or Firm* — Walter W. Duft (57) ABSTRACT

A technique for supporting user mode specification of Read-Copy Update (RCU) grace period latency to an operating system kernel-level RCU implementation. Non-expedited and expedited RCU grace period mechanisms are provided for invocation by RCU updaters performing RCU update operations to respectively initiate non-expedited and expedited grace periods. An expedited grace period indicator in a kernel memory space is provided for indicating whether a non-expedited RCU grace period or an expedited RCU grace period should be invoked. The non-expedited RCU grace period mechanism is adapted to check the expedited grace period indicator, and if an expedited RCU grace period is indicated, to invoke the expedited grace period mechanism. A communication mechanism is provided for use by a user mode application executing in a user memory space to manipulate the expedited grace period indicator in the kernel memory space, and thereby control whether an expedited or non-expedited RCU grace period should be used.

21 Claims, 6 Drawing Sheets

(56) References Cited

U.S. PATENT DOCUMENTS

| | | | |
|---|---|---|---|
| 7,454,581 | B2 | 11/2008 | McKenney et al. |
| 7,472,228 | B2 | 12/2008 | McKenney et al. |
| 7,653,791 | B2 | 1/2010 | McKenney |
| 7,668,851 | B2 | 2/2010 | Triplett |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,873,612 | B2 | 1/2011 | McKenney et al. |
| 7,904,436 | B2 | 3/2011 | McKenney |
| 7,934,062 | B2 | 4/2011 | McKenney et al. |
| 7,953,708 | B2 | 5/2011 | McKenney et al. |
| 7,953,778 | B2 | 5/2011 | McKenney et al. |
| 7,987,166 | B2 | 7/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,307,173 | B2 | 11/2012 | McKenney |
| 2006/0112121 | A1 | 5/2006 | McKenney et al. |
| 2006/0265373 | A1 | 11/2006 | McKenney et al. |
| 2008/0082532 | A1 | 4/2008 | McKenney |
| 2008/0313238 | A1 | 12/2008 | McKenney et al. |
| 2009/0006403 | A1 | 1/2009 | McKenney |
| 2009/0077080 | A1 | 3/2009 | McKenney |
| 2009/0320030 | A1 | 12/2009 | Ogasawara |
| 2010/0023946 | A1* | 1/2010 | McKenney ................... 718/102 |
| 2011/0283082 | A1 | 11/2011 | McKenney et al. |
| 2012/0047140 | A1 | 2/2012 | McKenney et al. |
| 2012/0079301 | A1 | 3/2012 | McKenney |
| 2012/0144129 | A1 | 6/2012 | McKenney |
| 2012/0324170 | A1 | 12/2012 | McKenney |
| 2012/0324461 | A1 | 12/2012 | McKenney |
| 2012/0324473 | A1 | 12/2012 | McKenney |
| 2012/0331237 | A1 | 12/2012 | McKenney |
| 2012/0331238 | A1 | 12/2012 | McKenney |
| 2013/0061071 | A1 | 3/2013 | McKenney |

OTHER PUBLICATIONS

A. Arcangeli et al., "Using Read-Copy-Update Techniques for System V IPC in the Linux 2.5 Kernel," 2003 FREENIX, Jun. 14, 2003, 13 pages.
P. McKenney, "The RCU API, 2010 Edition", LWN.net, Dec. 8, 2010, 11 pages.
M. Desnoyers et al., "User-Level Implementations of Read-Copy Update", IEEE Transactions on Parallel and Distributed Systems, vol. x, No. y, Jul. 2009, pp. 1-14.
J. Triplett, "Scalable Concurrent Hash Tables via Relativistic Programming", ACM-SIGOPS Operating System Review vol. 44, Issue 3, Jul. 2010, 14 pages.
T. Gleixner, High Resolution Timers / Dynamic Tics—V2, LWN.net, Oct. 31, 2006, 5 pages.
D. Brodkowski, "Re: A few questions and issues with dynticks, NOHZ and powertop", Apr. 6, 2010, see <http://linux.derkeiler.com/Mailing-Lists/Kernel/2010-04/msg01380.html>, 4 pages.
ip.com et al.; "Avoiding Unnecessary Wakeups When Waking Up CPUs At the Completion of a Grace Period", IPCOM000216206D, Mar. 25, 2012.
Hornbeck et al., "Power Management in the Linux Kernel", Apr. 7, 2011, pp. 1-31.
McKenney, "Getting RCU Further Out of the Way", 2012 Linux Plumbers Conference, Real Time Microconference, Aug. 31, 2012, 31 pages.
J. Seigh, "RCU + SMR for preemptive kernel/user threads," Linux Kernel Mailing List, May 9, 2005, 2 pages.
M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.
P. McKenney et al., "Scaling dcache with RCU," Linux Journal, Jan. 1, 2004, 12 pages.
P. McKenney et al., "Using RCU in the Linux 2.5 Kernel," Linux Journal, Oct. 1, 2003, 11 pages.
P. McKenney et al.,"Read-Copy Update," 2002 Ottawa Linux Symposium, Jul. 8, 2002, 32 pages.
H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
McKenney, "Seven real-time Linux approaches (Part C)", LinuxDevices.com, Jun. 7, 2005, 13 pages.
P. McKenney, "RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Oct. 9, 2006, 10 pages.
P. McKenney, "Read-Copy Update Implementations", 2001, 3 pages.
M. Herlihy, "A Methodology for Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.
P. McKenney et al., "Extending RCU for Realtime and Embedded Workloads," 2006 Ottawa Linux Symposium, Aug. 11, 2006, 15 pages.
P. McKenney, "The design of preemptible read-copy-update," LWN.net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, and, If So, What Can You Do About It", Mar. 8, 2009, 146 pages.

(56) References Cited

OTHER PUBLICATIONS

P. McKenney, "Priority-Boosting RCU Read-Side Critical Sections," LWN.net, Feb. 5, 2007, 15 pages.

P. McKenney et al., "Towards hard realtime response from the Linux kernel on SMP hardware," linux.conf.au, Canberra, Australia, Apr. 2005, 16 pages.

P. McKenney et al., "Exploiting Deferred Destruction: An Analysis of Read-Copy-Update Techniques in Operating System Kernels", Jan. 3, 2005, pp. 1-41.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenney, "Simplicity Through Optimization", linux.conf.au, Jan. 2010, 109 pages.

P. McKenney, "Deterministic Synchronization in Multicore Systems: the Role of RCU", Aug. 18, 2009, pp. 1-9.

P. McKenney, "RCU cleanups and simplified preemptable RCU", LKML.org, Jul. 23, 2009, 1 page.

P. McKenney, "Expedited "big hammer" RCU grace periods", LKML.org, Jun. 25, 2009, 2 pages.

P. McKenney, "RCU: The Bloatwatch Edition", LWN.net, Mar. 17, 2009, 9 pages.

M. Desnoyers, "Low-Impact Operating System Tracing", University of Montreal, PhD Thesis, Dec. 2009, 233 pages.

P. McKenney, "Using a Malicious User-Level RCU to Torture RCU-Based Algorithms", linux.conf.au, Jan. 2009, 51 pages.

P. McKenney et al., "Introducing Technology Into the Linux Kernel: A Case Study", Operating Systems Review, Jul. 2008, 16 pages.

P. McKenney, "What is RCU, Fundamentally", LWN.net, Dec. 17, 2007, 15 pages.

P. McKenney, What is RCU? Part 2: Usage, LWN.net, Dec. 24, 2007, 15 pages.

P. McKenney, RCU part 3: the RCU API, LWN.net, Jan. 7, 2008, 7 pages.

T. Hart et al., "Performance of memory reclamation for lockless synchronization", Journal of Parallel and Distributed Computing, Dec. 2007, pp. 1270-1285.

McKenney, "Using Promela and Spin to verify parallel algorithms", LWN.net, Aug. 1, 2007, 11 pages.

McKenney, "RCU and Unloadable Modules", LWN.net, Jan. 14, 2007, 4 pages.

\* cited by examiner

EXPEDITING RCU GRACE PERIODS UNDER USER MODE CONTROL

BACKGROUND

1. Field

The present disclosure relates to computer systems and methods in which data resources are shared among data consumers while preserving data integrity and consistency relative to each consumer. More particularly, the disclosure concerns an implementation of a mutual exclusion mechanism known as "read-copy update" in an energy-efficient computing environment.

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

Figure 1A:
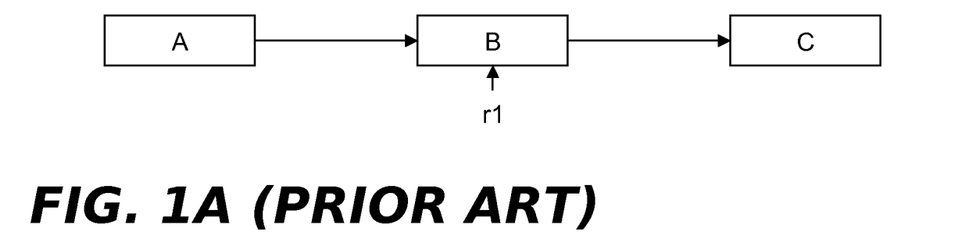
FIGS. 1A-1D are diagrammatic representations of a linked list of data elements undergoing a data element replacement according to a conventional read-copy update mechanism.
Figure 1B:
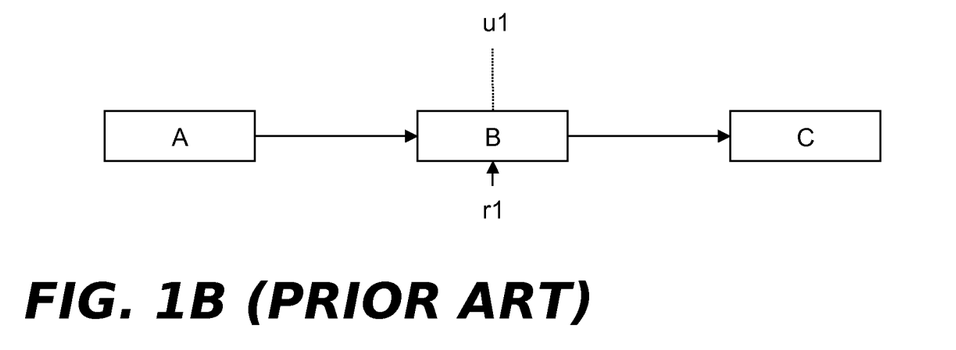
Figure 1C:
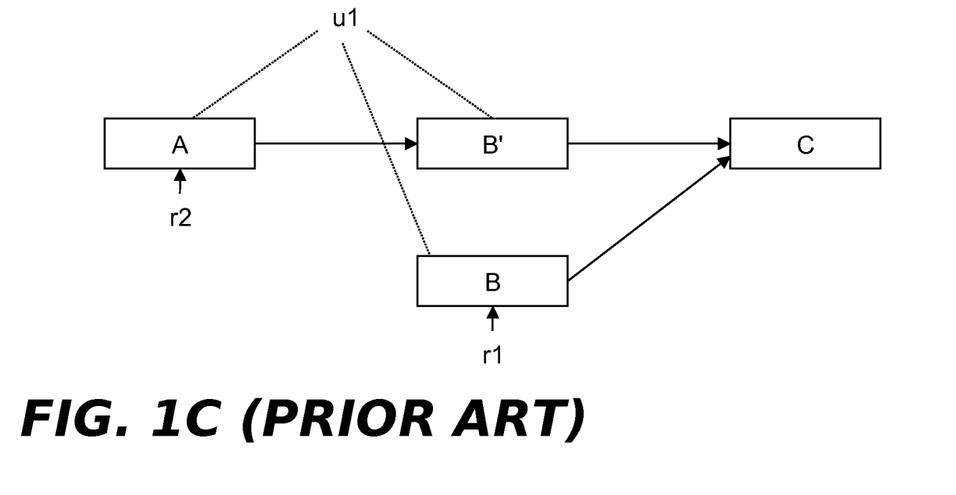

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

Figure 1D:
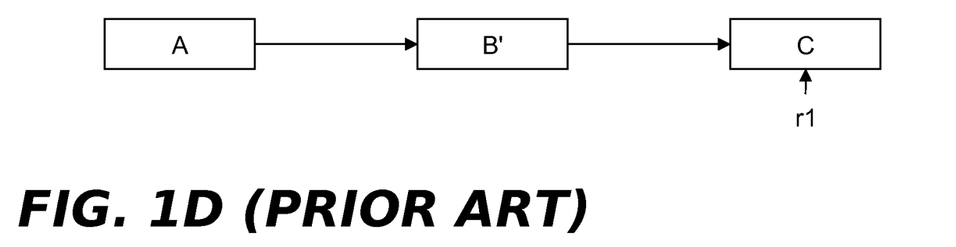

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

Figure 2A:
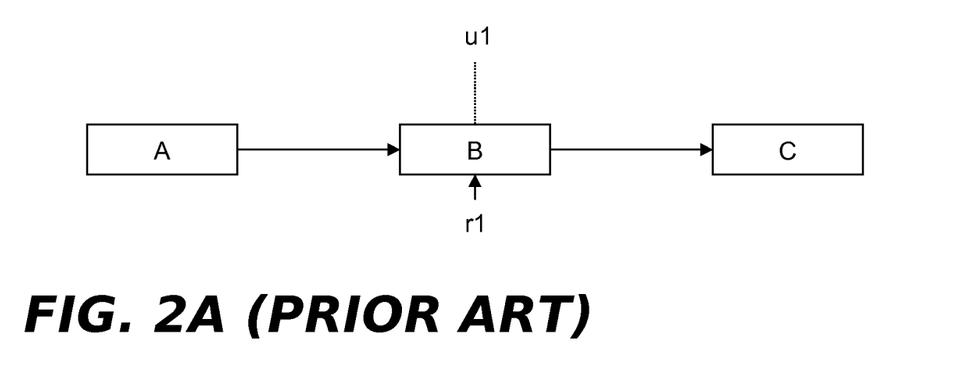
FIGS. 2A-2C are diagrammatic representations of a linked list of data elements undergoing a data element deletion according to a conventional read-copy update mechanism.
Figure 2B:
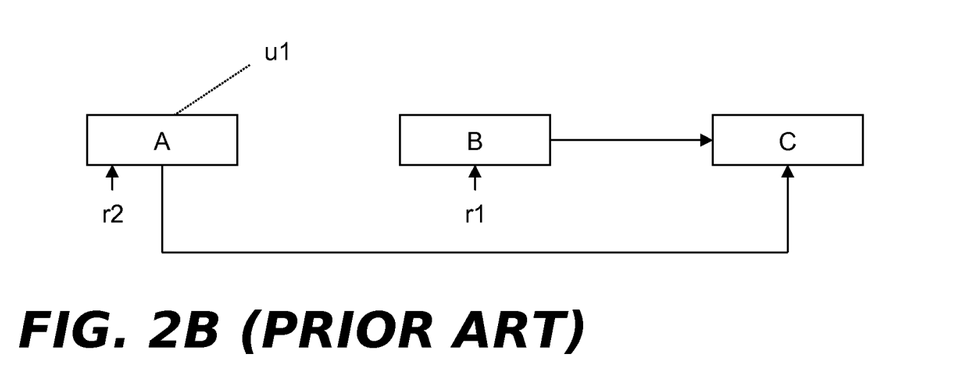
Figure 2C:
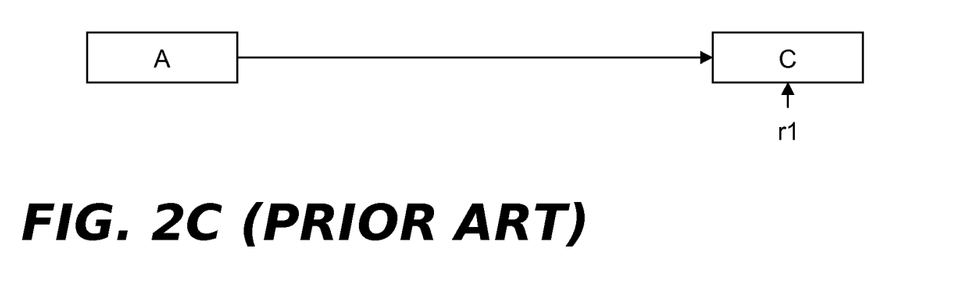

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch. In preemptible operating system kernels, additional steps are needed to account for readers that were preempted within their RCU read-side critical sections. In current RCU implementations designed for the Linux® kernel, a blocked reader task list is maintained to track such readers. A grace period will only end when the blocked task list indicates that is safe to do so because all blocked readers associated with the grace period have exited their RCU read-side critical sections. Other techniques for tracking blocked readers may also be used, but tend to require more read-side overhead than the current blocked task list method.

Figure 3:
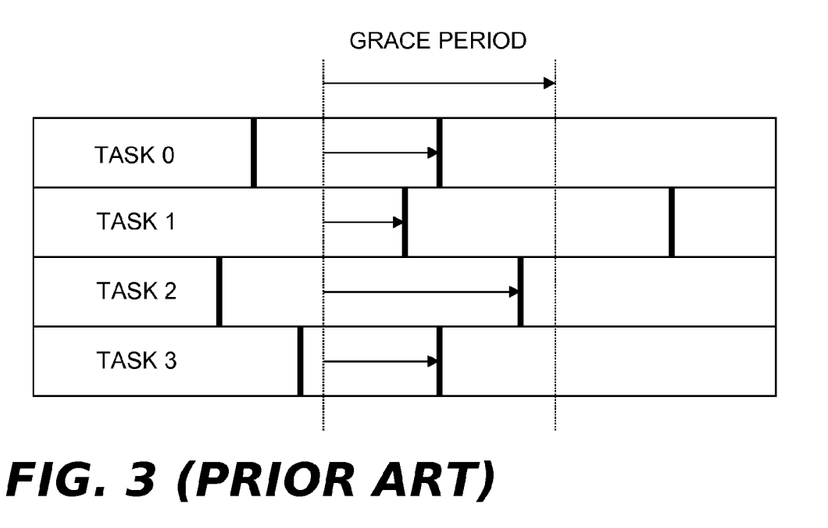
FIG. 3 is a flow diagram illustrating a grace period in which four processes pass through a quiescent state.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may be synchronous or asynchronous. According to the synchronous technique, an updater performs the first phase update operation, invokes an RCU primitive such as synchronize_rcu( ) to advise when all current RCU readers have completed their RCU critical sections and the grace period has ended, blocks (waits) until the grace period has completed, and then implements the second phase update operation, such as by removing stale data. According to the asynchronous technique, an updater performs the first phase update operation, specifies the second phase update operation as a callback using an RCU primitive such as call_rcu( ), then resumes other processing with the knowledge that the callback will eventually be processed at the end of a grace period. Advantageously, callbacks requested by one or more updaters can be batched (e.g., on callback lists) and processed as a group at the end of an asynchronous grace period. This allows the grace period overhead to be amortized over plural deferred update operations.

The length of an RCU grace period has performance implications. Although RCU can greatly improve the performance and latency of read-side accesses, it can in a number of cases degrade update-side accesses. This is a design choice: the purpose of RCU is to improve read-side performance in read-mostly situations. In addition, on the update side there is a trade-off between grace-period latency and per-update overhead. Longer latencies allow the overhead of a single grace to be amortized over a larger number of updates, thereby reducing the per-update overhead. In addition, the longer-latency RCU grace-period primitives are typically more energy-efficient than are the expedited primitives, which must in some cases send IPIs to sleeping CPUs. The Linux Kernel®, which makes extensive use of RCU, is generally tuned to have relatively long grace-period latencies, although there are "expedited" primitives that can be used within the kernel to shift the trade-off towards high CPU overhead in favor of shorter latencies. However, there are times when a trade-off towards shorter RCU grace period latencies may be desirable, for example, during boot time or when starting some networking applications, such as the Wireshark™ network packet analyzer. Applicant submits that it would be particularly beneficial for user mode execution to have a way of specifying RCU grace period latency to RCU, and for RCU to have a way of responding to this specification. Preferably, such an approach would have the ability to correctly handle overlapping specifications from different user mode tools and use cases.

SUMMARY

A method, system and computer program product are provided for supporting user mode specification of RCU grace period latency to an operating system kernel-level RCU implementation. In an embodiment, there is provided a non-expedited RCU grace period mechanism for invocation by RCU updaters when performing RCU update operations to initiate a non-expedited grace periods, and an expedited RCU grace period mechanism for invocation by RCU updaters when performing RCU update operations to initiate expedited grace periods. There is further provided a expedited grace period indicator in a kernel memory space for indicating whether a non-expedited RCU grace period or an expedited RCU grace period should be invoked. The non-expedited RCU grace period mechanism is adapted to check the expedited grace period indicator, and if the expedited grace period indicator indicates that an expedited RCU grace period should be invoked, to invoke the expedited grace period mechanism. A communication mechanism is provided for use by a user mode application executing in a user memory space to manipulate the expedited grace period indicator in the kernel memory space, and thereby control whether an expedited or non-expedited RCU grace period should be used.

In an embodiment, the expedited grace period indicator may comprise a counter whose value indicates whether or not an expedited grace period has been requested by the user mode application.

In an embodiment, the communication mechanism may comprise a pair of files of an in-memory file system, the files corresponding to kernel functions that manipulate the expedited grace period indicator. A first one of the files may correspond to a kernel function that manipulates the expedited grace period indicator to indicate a need for an expedited grace period. A second one of the files may correspond to a kernel function that manipulates the expedited grace period indicator to indicate a need for a normal grace period.

In an embodiment, the communication mechanism may comprise a device driver that manipulates the expedited grace period indicator.

In an embodiment, the communication mechanism may comprise (1) a pair of files of an in-memory file system, the files corresponding to kernel functions that manipulate the expedited grace period indicator, and (2) a device driver that manipulates the expedited grace period indicator. The pair of files and the device driver may be used by the user mode application to request expedited grace periods at different stages of operation of the computer system.

In an embodiment, the expedited grace period indicator is set during a system boot mode of said computer system based on a user-specified kernel boot parameter.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 4:
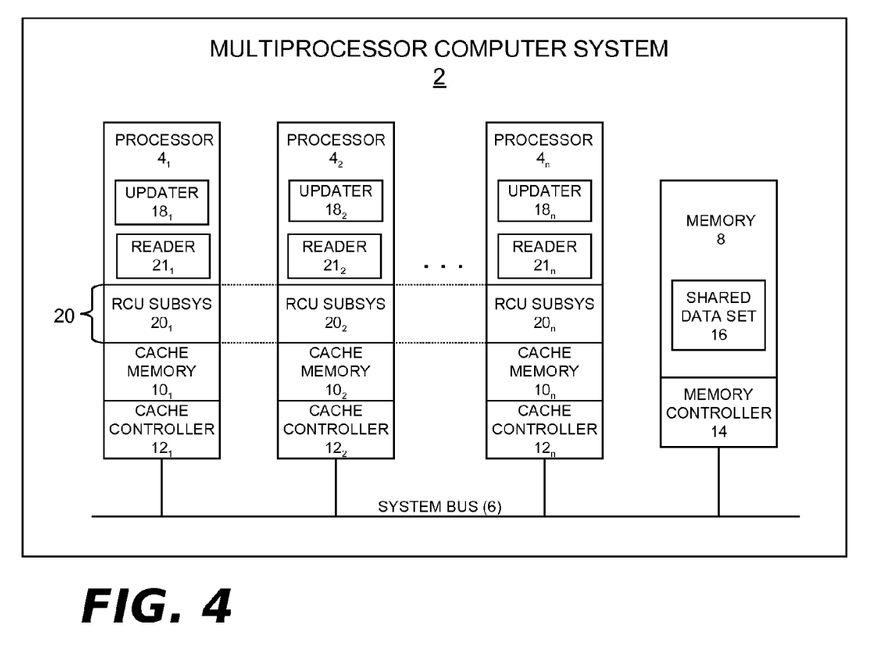
FIG. 4 is a functional block diagram showing a multiprocessor computer system that may be implemented in accordance with the present disclosure.

Turning now to the figures, wherein like reference numerals represent like elements in all of the several views, FIG. 4 illustrates an example multiprocessor computer system 2 that may be used to implement the technique disclosed herein. A uniprocessor computer system could also be used. The computer system 2 includes multiple processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A memory controller 14 is associated with the memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art).

The computer system 2 may represent any of several different types of computing apparatus. Such apparatus may include, but are not limited to, general purpose computers, special purpose computers, portable computing devices, communication and/or media player devices, set-top devices, embedded systems, to name but a few. The processors $4_1, 4_2 \ldots 4_n$ may each be a single-core CPU device. Alternatively, the processors $4_1, 4_2 \ldots 4_n$ could represent individual cores within a multi-core CPU device. Each CPU device embodied by any given processor 4 is operable to execute program instruction logic under the control of a software program stored in the memory 8 (or elsewhere). The memory 8 may comprise any type of tangible storage medium capable of storing data in computer readable form, including but not limited to, any of various types of random access memory (RAM), various flavors of programmable read-only memory (PROM) (such as flash memory), and other types of primary storage. The processors $4_1, 4_2 \ldots 4_n$ may be situated within a single computing device or node (e.g., as part of a single-node SMP system) or they may be distributed over plural nodes (e.g., as part of a NUMA system, a cluster, a cloud, etc.).

An update operation (updater) 18 may periodically execute within a process, thread, or other execution context (hereinafter "task") on any processor 4. Each updater 18 runs from program instructions stored in the memory 8 (or elsewhere) in order to periodically perform updates on a set of shared data 16 that may be stored in the shared memory 8 (or elsewhere). In FIG. 4, reference numerals $18_1, 18_2 \ldots 18_n$ illustrate individual data updaters that may periodically execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 are programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may periodically execute on the several processors $4_1, 4_2 \ldots 4_n$. Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may periodically execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element. Embodiments of the updaters 18 and the readers 21 may be preemptible, and embodiments of the system 2 may, for example, support real-time operations.

During run time, an updater 18 will occasionally perform an update to one of the shared data elements 16. In accordance the philosophy of RCU, a first-phase update is performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view following a grace period (second-phase update). As described in the "Background" section above, this is known as asynchronous grace period processing.

The RCU subsystem 20 may handle both asynchronous and synchronous grace periods. Each type of grace period processing entails starting new grace periods and detecting the end of old grace periods so that the RCU subsystem 20 knows when it is safe to free stale data (or take other actions). Asynchronous grace period processing further entails the management of callback lists that accumulate callbacks until they are ripe for batch processing at the end of a given grace period. Grace period processing operations may be performed by periodically running the RCU subsystem 20 on each of the several processors $4_1, 4_2 \ldots 4_n$ in FIG. 4. As is known, different aspects of such processing may be variously invoked by an operating system scheduler and an scheduling clock interrupt handler, and run in a combination of process context and bottom half context or kernel thread context.

Figure 5:
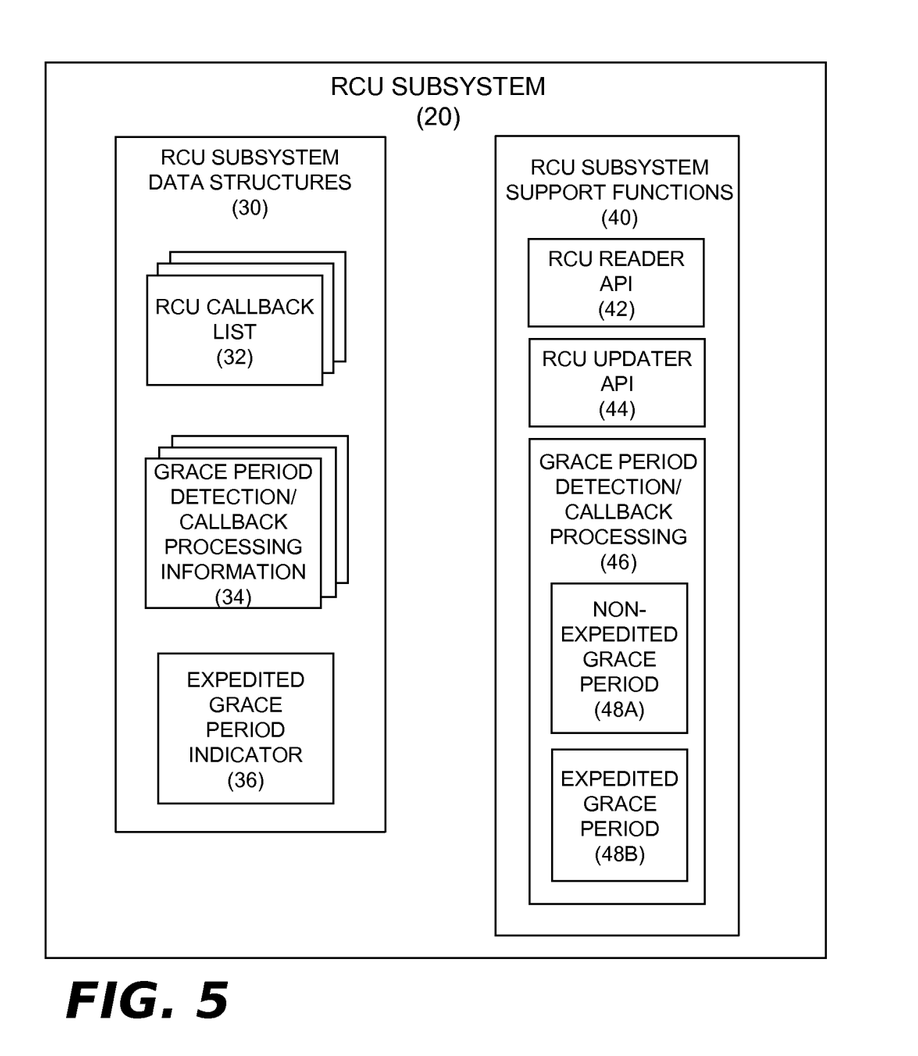
FIG. 5 is a functional block diagram showing an example RCU subsystem that may be provided in the computer system of FIG. 4.

FIG. 5 illustrates example components of the RCU subsystem 20. Among these components are several RCU subsystem data structures 30, including one or more RCU callback lists 32, one or more data structures comprising grace period detection and callback processing information 34, and an expedited grace period indicator 36. The RCU callback lists 32 are provided on a per-processor basis. As is conventionally known, each callback list accumulates RCU callbacks for batch processing at the end of grace periods, with each list typically comprising several list portions that respectively accumulate callbacks for a given grace period. The grace period/callback processing information 34 may also be provided on a per-processor basis, and is used to track grace periods and quiescent states, and to manipulate the callback lists 32. The expedited grace period indicator 36 is used to indicate whether an expedited or a non-expedited grace period should be implemented by the RCU subsystem 20. The nature and purpose of this indicator is described in more detail below.

With continuing reference to FIG. 5, additional example components of the RCU subsystem 20 include several RCU subsystem support functions 40, namely, an RCU reader API (Application Programming Interface) 42, an RCU updater API 44, and various grace period detection and callback processing functions 46, including an non-expedited grace period function 48A and an expedited grace period function 48B.

As stated in the Background section above, some RCU implementations, such as those used in recent versions of the Linux Kernel®, are generally tuned to have relatively long grace-period latencies. In the illustrated embodiment, the non-expedited grace period function 48A shown in FIG. 5 provides such relatively long grace periods. The synchronize_rcu( ) primitive of existing RCU implementations exemplifies this approach. However, there are "expedited" primitives that can be used within the kernel to shift the trade off towards high CPU overhead in favor of shorter latencies. The synchronize_rcu_expedited( ) primitive of existing RCU implementations exemplifies this approach. In the illustrated embodiment, the expedited grace period function 48B shown in FIG. 5 provides such shorter latency grace periods.

As further stated in the Background section above, there are times when user mode execution needs to specify a trade off towards shorter RCU grace period latencies, for example, during boot time or when starting some networking applications such as Wireshark™. It would be particularly beneficial for user mode execution to have a way of specifying RCU grace period latency to the RCU subsystem 20, and for the RCU subsystem to have a way of responding to this specification. Preferably, such an approach would have the ability to correctly handle overlapping specifications from different user mode tools and use cases.

The present disclosure sets forth a technique that allows a user mode application to specify whether a non-expedited grace period or an expedited grace period should be invoked by the RCU subsystem 20. The general approach is to make the non-expedited grace-period function 48A check the expedited grace period indicator 36, and if that indicator is set to a certain value, invoke the expedited versions.

Figure 6:
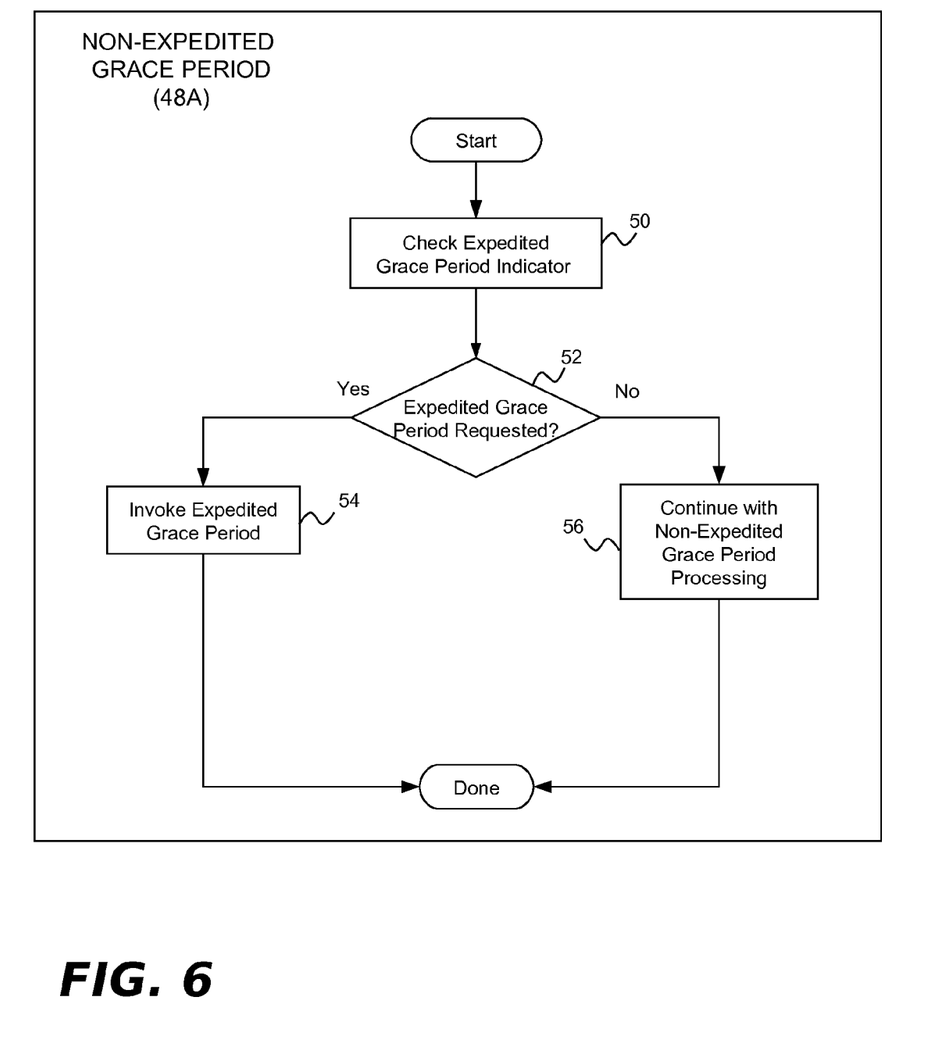
FIG. 6 is a flow diagram showing example operations that may be performed by the RCU subsystem of FIG. 5 to support user application specification of grace period latency.

The expedited grace period indicator 36 may be implemented in various ways, with a simple approach being to use a counter. In that case, a counter value of zero could indicate that a normal grace period should be invoked, and a non-zero value could indicate that an expedited grace period should be invoked. Example operations are shown in FIG. 6. As indicated above, these operations are performed by the non-expedited grace period function 48A. Block 50 of this functions checks the expedited grace period indicator 36, and block 52 tests its value. If an expedited grace period is indicated, block 54 invokes the expedited grace period function 48B while bypassing non-expedited grace period processing. If an non-expedited grace period is indicated, block 56 continues with the non-expedited grace period processing.

In an embodiment, the non-expedited grace period function 48A may be implemented using a modified version of the synchronize_rcu( ) primitive found in existing RCU implementations. In that case, the following C-language code could be used to implement the operations performed by blocks 50-56 of FIG. 6:

```
    void synchronize_rcu_controllable(void)
1   {
2       if (user_mode_expedite) {
3           synchronize_rcu_expedited( );
``` void synchronize_rcu_controllable(void)

-continued

```
4           return;
5       }
6       /* continue normal synchronize_rcu( ) processing. */
7   }
```

In the foregoing code, line 2 implements blocks 50-52 of FIG. 6 and tests the expedited grace period indicator 36, which is a counter named "user_mode_expedite." If the user_mode_expedite counter has a non-zero value, line 3 implements block 54 of FIG. 5 and calls the expedited grace period function 48B, which in the code is implemented using the synchronize_rcu_expedited( ) primitive found in existing RCU implementations. If the user_mode_expedite counter has a zero value, line 6 implements block 56 of FIG. 5 and continues with the normal grace processing associated with the non-expedited grace period function 48A, which may be implemented using the synchronize_rcu( ) primitive found in existing RCU implementations.

Figure 7:
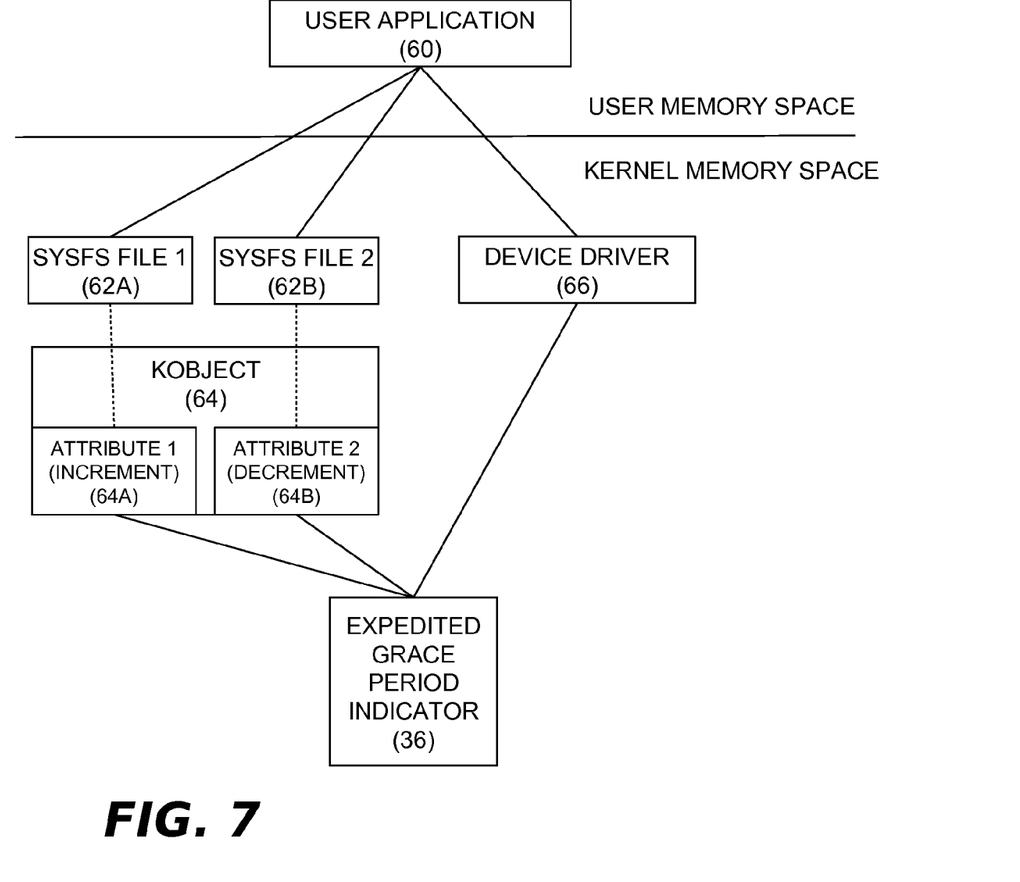
FIG. 7 is a functional block diagram showing operating system kernel components that may be used by a user application to specify the latency of a grace period implemented by the RCU subsystem of FIG. 5.

Turning now to FIG. 7, a communication mechanism is provided to enable a user mode application 60 executing in a user memory space to manipulate the expedited grace period indicator 36 in a kernel memory space, so that the user mode application can thereby control whether an expedited or a non-expedited RCU grace period should be used. The communication mechanism may be implemented in various ways. One approach is to use an in-memory file system, such as the sysfs facility in the Linux® kernel, to expose a pair of files that correspond to kernel functions that manipulate the expedited grace period indicator 36 to either indicate a need for either an expedited grace period or a normal grace period. The in-memory file system that contains the two files is mounted into a file system tree and the user application 60 is given read/write access to the files.

FIG. 7 illustrates the use of two Linux® sysfs files 62A (sysfs file 1) and 62B (sysfs file 2). As is known, a sysfs file corresponds to an attribute associated with a kernel object known as a kobject. This is because the Linux® sysfs facility allows a kobject attribute to be exported as a sysfs file that users can write to in order to invoke the attribute. A kobject attribute may comprise any desired function, including a function that manipulates a kernel variable. In FIG. 7, there are two kobject attributes 64A (attribute 1) and 64B (attribute 2) of a kobject 64. The kobject attributes 64A and 64B are respectively associated with sysfs files 62A and 62B. A write to sysfs file 62A has the effect of invoking the kobject attribute 64A, and a write to sysfs 62B has the effect of invoking the kobject attribute 64B. This effect can be accomplished with typical use of the Linux® kernel's sysfs facility.

Assuming the expedited grace period indicator 36 is implemented as a counter, the kobject attribute 64A may be written so that a write to sysfs file 62A increments the counter value (either atomically or under an appropriate lock). Conversely, the kobject attribute 64B may be written so that a write to sysf file 62B decrements the counter value (again, either atomically or under an appropriate lock). In both cases, it may be desirable to check for counter overflow/underflow, and return an error in those cases. The kobject attributes 64A and 64B are also written so that a read from either of sysfs file 62A or 62B will return the current value of the expedited grace period indicator 36. Again, this effect can be accomplished with typical use of the Linux® kernel's sysfs facility.

Using the foregoing sysfs communication mechanism, the user application 60 desiring to reduce RCU grace period latency may write to sysfs file 62A, carry out its operation that requires expedited RCU grace periods, and then write to sysfs file 62B. Appropriate file permissions on sysfs file 62A and 62B may be set to prevent unauthorized use of this facility.

One potential disadvantage of the sysfs communication mechanism is that RCU grace period operations can be left expedited if the application 60 aborts prior to the RCU grace period latency being reset. The mechanism is also subject to user-application bugs that might inappropriately write (or fail to write) to one or the other of the two sysfs files 62A or 62B.

A way to avoid this problem is to use an alternative communication mechanism implemented by a device driver 66 (shown in FIG. 7) that operates on the expedited grace period indicator 36 as a dummy device. Assuming the expedited grace period indicator 36 is a counter, the driver's open( ) function could increment the counter (again, either atomically or under an appropriate lock), and the driver's close( ) function could decrement the counter (yet again, either atomically or under an appropriate lock). There are many ways that the user mode application 60 could invoke the device driver 60. For example, a device read( ) operation could be used to increment the counter and a device write( ) operation could be used to decrement the counter. In an alternative embodiment, a device write( ) operation could be used to both increment and decrement the counter. For example, the first byte written could be interpreted as a signed character specifying the value to increment or decrement. In another alternative embodiment, a ioctl( ) operation could be used with a command value specifying either a counter increment or a counter decrement. In a still further alternative embodiment, an lseek(fd, value, SEEK_CUR) command could be used, where "fd" is the file descriptor open to the device in question and "value" is the amount to increment or decrement the counter, with a positive value indicating an increment and a negative value indicating a decrement.

An advantage of using the device driver 66 as a communication mechanism is that if the application 60 aborts, the device driver 66 will automatically close the dummy device and reset the expedited grace period indicator 36 to its default state, thereby avoiding the problem called out with the sysfs communication mechanism.

Note that the device driver communication mechanism may not be appropriate for system boot because there is no user application that runs for the duration of a boot sequence. However, once normal steady state operation commences, the device driver communication mechanism will be effective. To address the boot mode issue, a kernel boot parameter could be provided that allows users to specify an initial value of the expedited grace period indicator 36. If no boot parameter is specified, a default value could be set (e.g., to select non-expedited grace periods).

A third communication mechanism that could be used combines the first two communication mechanisms. In particular, the device driver communication mechanism could be provided for user mode applications during normal operation of the computer system 2, and the sysfs communication mechanism could be used under special circumstances. One special circumstance might arise during system boot mode, where late-time boot scripts that need to unconditionally enable expedited RCU grace period operation could use the sysfs technique (provided that the sysfs file system has already been set up during an earlier stage of the boot sequence). As another special circumstance warranting use of the sysfs communication mechanism, there may be situations where a time-based switch between non-expedited and expedite RCU grace period operation needs to be made (e.g., between expedited grace periods for interactive workloads during the day to ensure rapid response time, and non-expedited grace periods for batch processing workloads at night to ensure high throughput). A further special circumstance warranting use of the sysfs communication mechanism would be to provide convenient access for prototyping and scripting.

Accordingly, a technique for supporting user mode specification of RCU grace period latency to an operating system kernel-level RCU implementation. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIGS. 4-7. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 8:
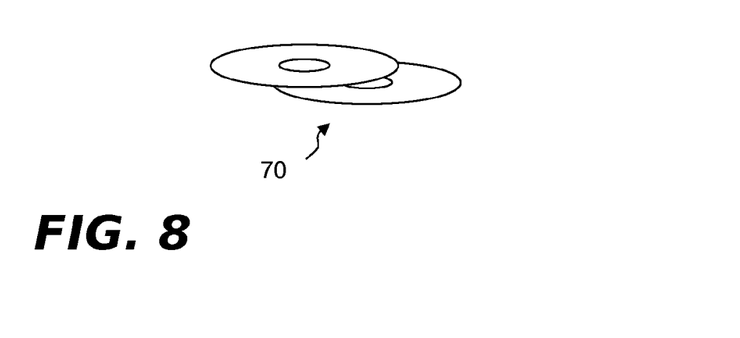
FIG. 8 is a diagrammatic illustration showing example data storage media that may be used to provide a computer program product in accordance with the present disclosure.

Example data storage media for storing such program instructions are shown by reference numerals 8 (memory) and 10 (cache) of the computer system 2 of FIG. 4. The system 2 may further include one or more secondary (or tertiary) storage devices (not shown) that could store the program instructions between system reboots. A further example of data storage media that may be used to store the program instructions is shown by reference numeral 70 in FIG. 8. The data storage media 70 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such data storage media can store the program instructions either alone or in conjunction with an operating system or other software product that incorporates the required functionality. The data storage media could also be provided by other portable data storage media (such as floppy disks, flash memory sticks, etc.), or data storage media combined with drive systems (e.g. disk drives). As is the case with the memory 8 and the cache 10 of FIG. 4, the data storage media may be incorporated in data processing platforms that have integrated random access memory (RAM), read-only memory (ROM) or other semiconductor or solid state memory. More broadly, the data storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of data storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a computer system having one or more processors operatively coupled to one or more memory devices, a method for supporting user mode specification of Read-Copy Update (RCU) grace period latency to an operating system kernel-level RCU implementation, the method comprising:
providing a non-expedited kernel-level RCU grace period mechanism for invocation by kernel-level RCU updaters when performing kernel-level RCU update operations to initiate non-expedited kernel-level RCU grace periods;
providing an expedited kernel-level RCU grace period mechanism for invocation by kernel-level RCU updaters when performing kernel-level RCU update operations to initiate expedited kernel-level RCU grace periods;
providing a expedited grace period indicator in a kernel memory space for indicating whether said non-expedited kernel-level RCU grace periods or said expedited kernel-level RCU grace periods should be invoked;
said non-expedited kernel-level RCU grace period mechanism being adapted to check said expedited grace period indicator, and if said expedited grace period indicator indicates that said expedited kernel-level RCU grace periods should be invoked, to invoke said expedited kernel-level RCU grace period mechanism; and
providing a communication mechanism for use by a user mode application executing in a user memory space to manipulate said expedited grace period indicator in said kernel memory space and thereby control whether said expedited or non-expedited kernel-level RCU grace periods should be used.

2. A method in accordance with claim 1, wherein said expedited grace period indicator comprises a counter whose value indicates whether or not said expedited kernel-level RCU grace periods have been requested by said user mode application.

3. A method in accordance with claim 1, wherein said communication mechanism comprises a pair of files of an in-memory file system, said files corresponding to kernel functions that manipulate said expedited grace period indicator.

4. A method in accordance with claim 1, wherein said communication mechanism comprises a pair of files of an in-memory file system, a first one of said files corresponding to a kernel function that manipulates said expedited grace period indicator to indicate a need for said expedited kernel-level RCU grace periods, and a second one of said files corresponding to a kernel function that manipulates said expedited grace period indicator to indicate a need for said non-expedited kernel-level RCU grace periods.

5. A method in accordance with claim 1, wherein said communication mechanism comprises a device driver that manipulates said expedited grace period indicator.

6. A method in accordance with claim 1, wherein said communication mechanism comprises (1) a pair of files of an in-memory file system, said files corresponding to kernel functions that manipulate said expedited grace period indicator, and (2) a device driver that manipulates said expedited grace period indicator, and wherein said pair of files and said device driver are used by said user mode application to request said expedited kernel-level RCU grace periods at different stages of operation of said computer system.

7. A method in accordance with claim 1, wherein said expedited grace period indicator is set during a system boot mode of said computer system based on a user-specified kernel boot parameter.

8. A system, comprising:
one or more processors;
a memory coupled to said one or more processors, said memory including a computer useable medium tangibly embodying at least one program of instructions executable by said processor to perform operations for supporting user mode specification of Read-Copy Update (RCU) grace period latency to an operating system kernel-level RCU implementation, said operations comprising:
providing a non-expedited kernel-level RCU grace period mechanism for invocation by kernel-level RCU updaters when performing kernel-level RCU update operations to initiate non-expedited kernel-level RCU grace periods;
providing an expedited kernel-level RCU grace period mechanism for invocation by kernel-level RCU updaters when performing kernel-level RCU update operations to initiate expedited kernel-level RCU grace periods;
providing a expedited grace period indicator in a kernel memory space for indicating whether said non-expedited kernel-level RCU grace periods or said expedited kernel-level RCU grace periods should be invoked;
said non-expedited kernel-level RCU grace period mechanism being adapted to check said expedited grace period indicator, and if said expedited grace period indicator indicates that said expedited kernel-level RCU grace periods should be invoked, to invoke said expedited kernel-level RCU grace period mechanism; and
providing a communication mechanism for use by a user mode application executing in a user memory space to manipulate said expedited grace period indicator in said kernel memory space and thereby control whether said expedited or non-expedited kernel-level RCU grace periods should be used.

9. A system in accordance with claim 8, wherein said expedited grace period indicator comprises a counter whose value indicates whether or not said expedited kernel-level RCU grace periods have been requested by said user mode application.

10. A system in accordance with claim 8, wherein said communication mechanism comprises a pair of files of an in-memory file system, said files corresponding to kernel functions that manipulate said expedited grace period indicator.

11. A system in accordance with claim 8, wherein said communication mechanism comprises a pair of files of an in-memory file system, a first one of said files corresponding to a kernel function that manipulates said expedited grace period indicator to indicate a need for said expedited kernel-level RCU grace periods, and a second one of said files corresponding to a kernel function that manipulates said expedited grace period indicator to indicate a need for said non-expedited kernel-level RCU grace periods.

12. A system in accordance with claim 8, wherein said communication mechanism comprises a device driver that manipulates said expedited grace period indicator.

13. A system in accordance with claim 8, wherein said communication mechanism comprises (1) a pair of files of an in-memory file system, said files corresponding to kernel functions that manipulate said expedited grace period indicator, and (2) a device driver that manipulates said expedited grace period indicator, and wherein said pair of files and said device driver are used by said user mode application to request said expedited kernel-level RCU grace periods at different stages of operation of said system.

14. A system in accordance with claim 8, wherein said expedited grace period indicator is set during a system boot mode of said system based on a user-specified kernel boot parameter.

15. A computer program product, comprising:
one or more non-transitory machine-useable storage media;
program instructions provided by said one or more media for programming a data processing platform to perform operations for supporting user mode specification of Read-Copy Update (RCU) grace period latency to an operating system kernel-level RCU implementation, said operations comprising:
providing a non-expedited kernel-level RCU grace period mechanism for invocation by kernel-level RCU updaters when performing kernel-level RCU update operations to initiate non-expedited kernel-level RCU grace periods;
providing an expedited kernel-level RCU grace period mechanism for invocation by kernel-level RCU updaters when performing kernel-level RCU update operations to initiate expedited kernel-level RCU grace periods;
providing a expedited grace period indicator in a kernel memory space for indicating whether said non-expedited kernel-level RCU grace periods or said expedited kernel-level RCU grace periods should be invoked;
said non-expedited kernel-level RCU grace period mechanism being adapted to check said expedited grace period indicator, and if said expedited grace period indicator indicates that said expedited kernel-level RCU grace periods should be invoked, to invoke said expedited kernel-level RCU grace period mechanism; and
providing a communication mechanism for use by a user mode application executing in a user memory space to manipulate said expedited grace period indicator in said kernel memory space and thereby control whether said expedited or non-expedited kernel-level RCU grace periods should be used.

16. A computer program product in accordance with claim 15, wherein said expedited grace period indicator comprises a counter whose value indicates whether or not said expedited kernel-level RCU grace periods have been requested by said user mode application.

17. A computer program product in accordance with claim 15, wherein said communication mechanism comprises a pair of files of an in-memory file system, said files corresponding to kernel functions that manipulate said expedited grace period indicator.

18. A computer program product in accordance with claim 15, wherein said communication mechanism comprises a pair of files of an in-memory file system, a first one of said files corresponding to a kernel function that manipulates said expedited grace period indicator to indicate a need for said expedited kernel-level RCU grace periods, and a second one of said files corresponding to a kernel function that manipulates said expedited grace period indicator to indicate a need for said non-expedited kernel-level RCU grace periods.

19. A computer program product in accordance with claim 15, wherein said communication mechanism comprises a device driver that manipulates said expedited grace period indicator.

20. A computer program product in accordance with claim 15, wherein said communication mechanism comprises (1) a pair of files of an in-memory file system, said files corresponding to kernel functions that manipulate said expedited grace period indicator, and (2) a device driver that manipulates said expedited grace period indicator, and wherein said pair of files and said device driver are used by said user mode application to request said expedited kernel-level RCU grace periods at different stages of operation of said system.

21. A computer program product in accordance with claim 15, wherein said expedited grace period indicator is set during a system boot mode of said computer system based on a user-specified kernel boot parameter.

* * * * *